(12) United States Patent
Oikawa

(10) Patent No.: US 7,783,392 B2
(45) Date of Patent: Aug. 24, 2010

(54) TRAVELING APPARATUS AND METHOD OF CONTROLLING THE SAME

(75) Inventor: Susumu Oikawa, Kanagawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 816 days.

(21) Appl. No.: 11/546,269

(22) Filed: Oct. 11, 2006

(65) Prior Publication Data

US 2007/0084662 A1    Apr. 19, 2007

(30) Foreign Application Priority Data

Oct. 13, 2005    (JP)    ............................. 2005-299325

(51) Int. Cl.
*G06F 17/00*    (2006.01)

(52) U.S. Cl. .............................. 701/1; 73/1.75; 73/510; 180/218; 702/151; 702/154; 280/6.15; 280/267; 280/40; 280/63

(58) Field of Classification Search ..................... 701/1, 701/50; 180/7.1, 218, 6.6; 172/4.5; 280/6.15, 280/267, 40, 63; 73/1.75, 1.77, 1.79, 482, 73/510, 514.02; 702/151, 154; *G06F 17/00; B62D 7/16*
See application file for complete search history.

(56) References Cited

U.S. PATENT DOCUMENTS

| | | | | |
|---|---|---|---|---|
| 6,062,600 | A * | 5/2000 | Kamen et al. ................ | 280/755 |
| 6,286,606 | B1 * | 9/2001 | Krieg et al. .................... | 172/4.5 |
| 6,332,103 | B1 * | 12/2001 | Steenson et al. ................ | 701/1 |
| 6,382,646 | B1 * | 5/2002 | Shaw ..................... | 280/87.041 |
| 6,557,873 | B2 * | 5/2003 | Nardone ................. | 280/87.042 |
| 6,810,738 | B2 * | 11/2004 | Sakaguchi ..................... | 73/510 |
| 7,079,928 | B2 * | 7/2006 | Lu et al. ........................ | 701/38 |
| 7,200,482 | B2 * | 4/2007 | Kawarasaki .................. | 701/97 |
| 7,275,607 | B2 * | 10/2007 | Kamen et al. ................. | 180/7.1 |
| 7,353,610 | B2 * | 4/2008 | Gerdes et al. .................. | 33/203 |
| 7,359,776 | B2 * | 4/2008 | Souda .......................... | 701/34 |
| 2004/0005958 | A1 * | 1/2004 | Kamen et al. .................. | 482/51 |
| 2004/0102166 | A1 * | 5/2004 | Morita et al. ............. | 455/152.1 |
| 2004/0133365 | A1 * | 7/2004 | Drumm et al. ................ | 702/41 |
| 2005/0072843 | A1 * | 4/2005 | Chladny ..................... | 235/384 |
| 2005/0134014 | A1 * | 6/2005 | Xie ........................ | 280/93.502 |
| 2006/0011398 | A1 * | 1/2006 | Kamen et al. ............... | 180/218 |

FOREIGN PATENT DOCUMENTS

| JP | 08303403 A | * | 11/1996 |
|---|---|---|---|
| JP | 09222921 A | * | 8/1997 |

\* cited by examiner

*Primary Examiner*—Tuan C To
(74) *Attorney, Agent, or Firm*—Oblon, Spivak, McClelland, Maier & Neustadt, L.L.P.

(57) ABSTRACT

A traveling apparatus is provided with two wheels parallel each of which is driven independently, being controlled to be stable in an anteroposterior direction between the two wheels and traveling. The traveling apparatus includes a mechanism estimating an inclination of a plane where a pitch angular velocity sensor is horizontally installed with respect to a horizontal plane by using a sensor measuring a tilt of a vehicle body in a roll axis direction and a mechanism calculating a correct pitch angle by obtaining a yaw rate mixed in the pitch angular velocity sensor based on the estimated inclination and a turn velocity of the vehicle body and by canceling the yaw rate mixed.

12 Claims, 13 Drawing Sheets

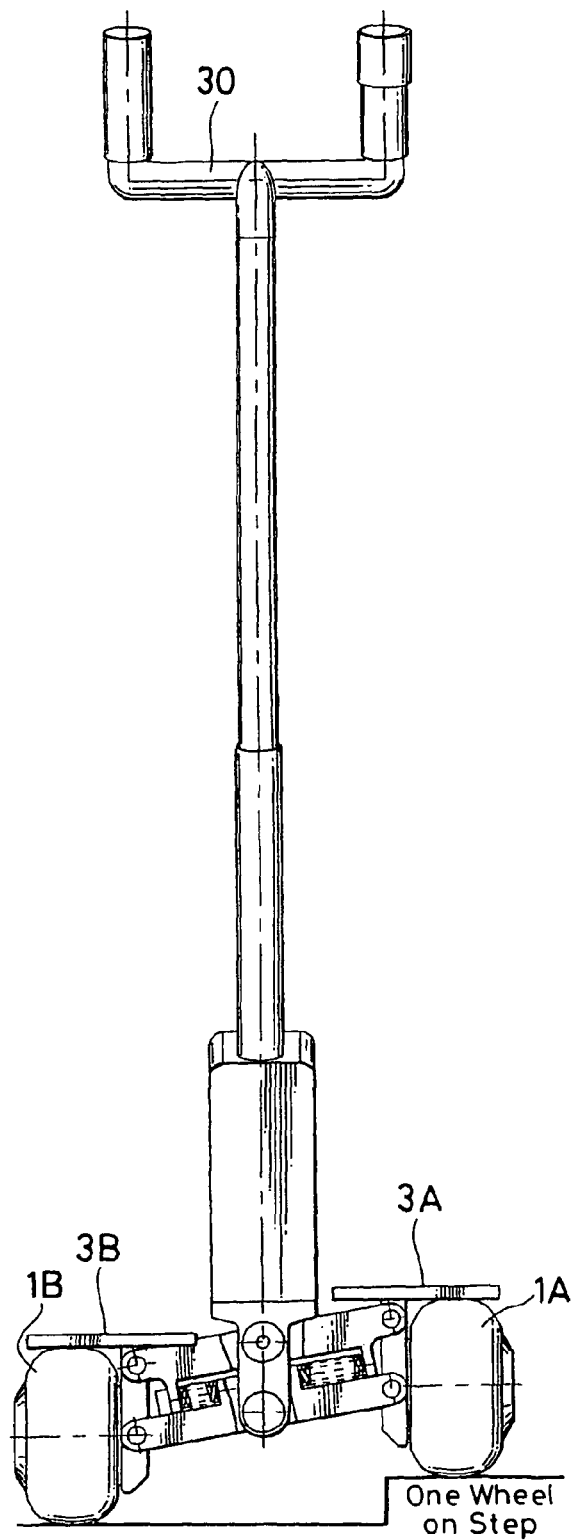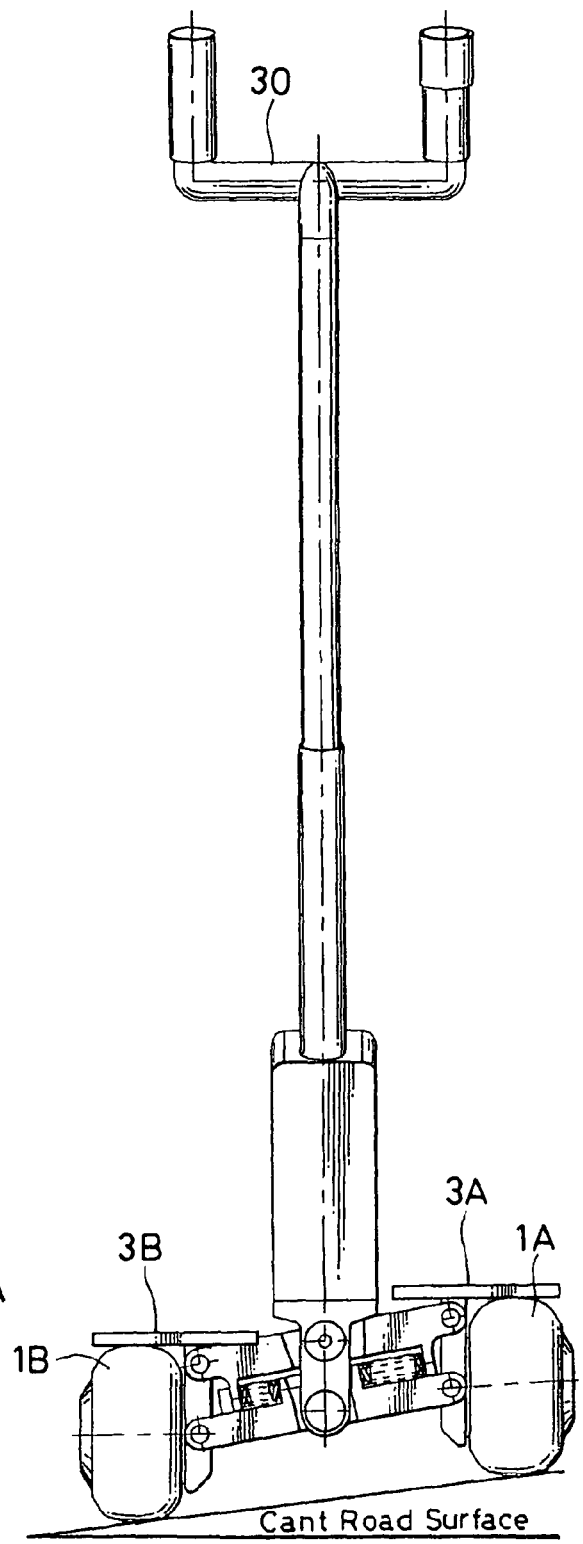

TRAVELING APPARATUS AND METHOD OF CONTROLLING THE SAME

CROSS REFERENCES TO RELATED APPLICATIONS

The present invention contains subject matter related to Japanese Patent Application JP 2005-299325 filed in the Japanese Patent Office on Oct. 13, 2005, the entire contents of which being incorporated herein by reference.

BACKGROUND OF THE INVENTION

1. Field of the Invention

The present invention relates to a traveling apparatus suitable for being applied to a coaxial two-wheel vehicle including two wheels disposed on the same axle center line, for example, and a method of controlling the traveling apparatus. Specifically, the present invention relates to a technology for controlling the traveling apparatus by obtaining a tilt of a vehicle body at the time of turning.

2. Description of the Related Art

U.S. Pat. No. 6,288,505 (specification), for example, proposes a vehicle on which a man rides, traveling with two wheels disposed parallel.

SUMMARY OF THE INVENTION

A traveling apparatus traveling with two wheels disposed parallel such as the vehicle described in U.S. Pat. No. 6,288, 505 is basically unstable with respect to an anteroposterior direction. Therefore, there is provided a mechanism measuring a posture of a vehicle body using a sensor that detects a tilt in the anteroposterior direction (pitch axis), appropriately controlling the wheels to obtain stability. On the other hand, it has been considered that there is no necessity of detecting a tilt in a lateral direction (roll axis) since the vehicle is stable with respect to the lateral direction and thus a control thereof is not necessary.

However, if a gyroscopic sensor, for example, is used as an angular velocity sensor detecting a change in tilt to measure the tilt of the pitch axis accurately, there may be performed such control that a balance is kept to make a measured value become zero, that is, not to change an angle. Therefore, when turning on an inclined plane, a vehicle is caused to make the turn such that a pitch angle is kept unchanged with respect to an inclined plane.

As shown in FIG. 1, since the angle for keeping the balance changes depending on whether the vehicle faces in the ascending direction or in the descending direction of the inclined plane during the turn, there is a possibility of a rider being in a difficult condition to keep the balance. Hence, measures not allowing a turn on such inclined plane may be needed in a control system of related art, which discourages sufficient driving performance of the vehicle.

The inventors of the present application have recognized the above-described problems. It is desirable to control a vehicle for stable traveling, because in related art it may be difficult for a rider to keep the balance of the vehicle since the angle for keeping the balance changes depending on whether the vehicle faces in the ascending direction or in the descending direction of the inclined plane when making the turn on an inclined plane. Further, measures not to allow a turn on such inclined plane may be required in the control system in related art.

Therefore, according to an embodiment of the present invention, an inclination of a plane where a pitch angular velocity sensor is horizontally installed is estimated with respect to a horizontal plane using a sensor measuring a tilt of a vehicle body in a roll axis direction. Then, a yaw rate mixed in the pitch angular velocity sensor is obtained based on the estimated inclination and a turn velocity of the vehicle body so that a correct pitch angle is calculated by canceling the yaw rate mixed. Using an obtained angle thus formed between the turning plane and the vehicle body, the vehicle is controlled to be stable during the turning.

According to an embodiment of the present invention, there is provided a traveling apparatus including two wheels provided parallel each of which is driven independently, being controlled to be stable in an anteroposterior direction between the two wheels and traveling. The traveling apparatus includes means for estimating an inclination of a plane where a pitch angular velocity sensor is horizontally installed with respect to the horizontal plane by using a sensor measuring a tilt of a vehicle body in a roll axis direction. Further the traveling apparatus includes means for calculating a correct pitch angle by obtaining a yaw rate mixed in the pitch angular velocity sensor based on the estimated inclination and a turn velocity of the vehicle body and by canceling the yaw rate mixed. Thus, the vehicle is controlled to be stable during the turning.

According to another embodiment of the present invention, there is provided a traveling apparatus including two wheels provided parallel each of which is driven independently, having a link structure in which a vehicle body is divided in two of upper and lower portions maintained parallel between the two wheels, being controlled to be stable in an anteroposterior direction between the two wheels and traveling. The traveling apparatus includes means for calculating a tilt angle of a turning plane with respect to the horizontal plane when the vehicle body makes a turn being inclined toward the roll axis direction with respect to a traveling plane. The tilt angle is calculated by adding a value measured by a roll axis tilt sensor to a roll angle formed between the turning plane and the vehicle body and obtained based on measurement of a state inside the vehicle body and geometrical calculations. Thus, an accurate tilt angle of the turning plane can be calculated.

According to further embodiment of the present invention, there is provided a traveling apparatus further including means for calculating a correct pitch angle by obtaining a yaw rate mixed in the pitch angular velocity sensor and by canceling the yaw rate mixed. The means obtains the yaw rate based on the obtained roll angle formed between the horizontal plane and the vehicle body, the calculated tilt angle formed between the horizontal plane and the turning plane, and the turn velocity of the vehicle body. Thus, the vehicle is controlled to be stable during the turning.

According to further another embodiment of the present invention, there is provided a method of controlling a traveling apparatus including two wheels provided parallel each of which is driven independently, being controlled to be stable in an anteroposterior direction between the two wheels and traveling. The method includes the steps of: estimating an inclination of a plane where a pitch angular velocity sensor is horizontally installed with respect to the horizontal plane by using a sensor measuring a tilt of a vehicle body in a roll axis direction; obtaining a yaw rate mixed in the pitch angular velocity sensor based on the estimated inclination and a turn velocity of the vehicle body; and calculating a correct pitch angle by canceling the yaw rate mixed. Thus, the vehicle is controlled to be stable during the turning.

According to still another embodiment of the present invention, there is provided a method of controlling a traveling apparatus including two wheels provided parallel each of which is driven independently, having a link structure in which a vehicle body is divided in two of upper and lower portions maintained parallel between the two wheels, being controlled to be stable in an anteroposterior direction between the two wheels and traveling. The method includes the steps of: obtaining a roll angle formed between the turning plane and the vehicle body based on measurement of a state inside the vehicle body and geometrical calculations; and calculating a tilt angle of a turning plane with respect to the horizontal plane by adding a measured value of a roll axis tilt sensor to the roll angle, when the vehicle body makes a turn being inclined toward the roll axis direction with respect to the traveling plane. Thus, an accurate tilt angle of the turning plane can be calculated.

According to yet another embodiment of the present invention, there is provided a method of controlling a traveling apparatus. The method further includes the steps of: obtaining a yaw rate mixed in the pitch angular velocity sensor based on the obtained roll angle formed between the horizontal plane and the vehicle body, the calculated tilt angle formed between the horizontal plane and the turning plane, and the turn velocity of the vehicle body; and calculating a correct pitch angle by canceling the yaw rate mixed. Thus, the vehicle is controlled to be stable during the turning.

Accordingly, as described above, in related art there has been a possibility of a rider being in a difficult condition to keep the balance, because the angle for keeping the balance may change depending on whether the vehicle faces in the ascending direction or in the descending direction of the inclined plane during the turn. Hence, measures not allowing the turn on such inclined plane may be needed in a control system of related art, which discourages sufficient driving performance of the vehicle. However, according to embodiments of the present invention turning on an inclined plane can be controlled without difficulty.

BRIEF DESCRIPTION OF THE DRAWINGS

FIGS. 6A and 6B are diagrams for explaining an embodiment of the present invention;

DESCRIPTION OF THE PREFERRED EMBODIMENTS

Figure 1:
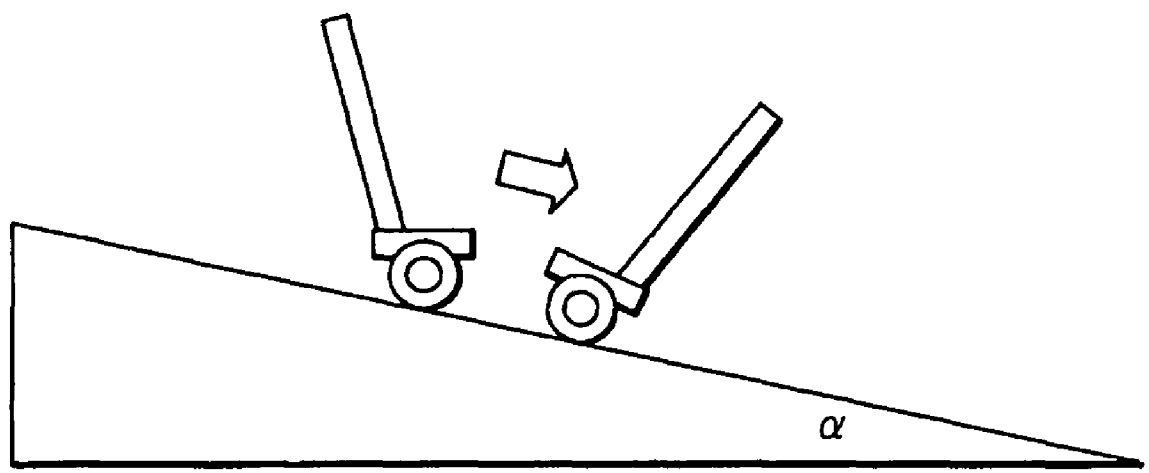
FIG. 1 is a diagram for explaining a traveling state on an inclined plane in related art.
Figure 2:
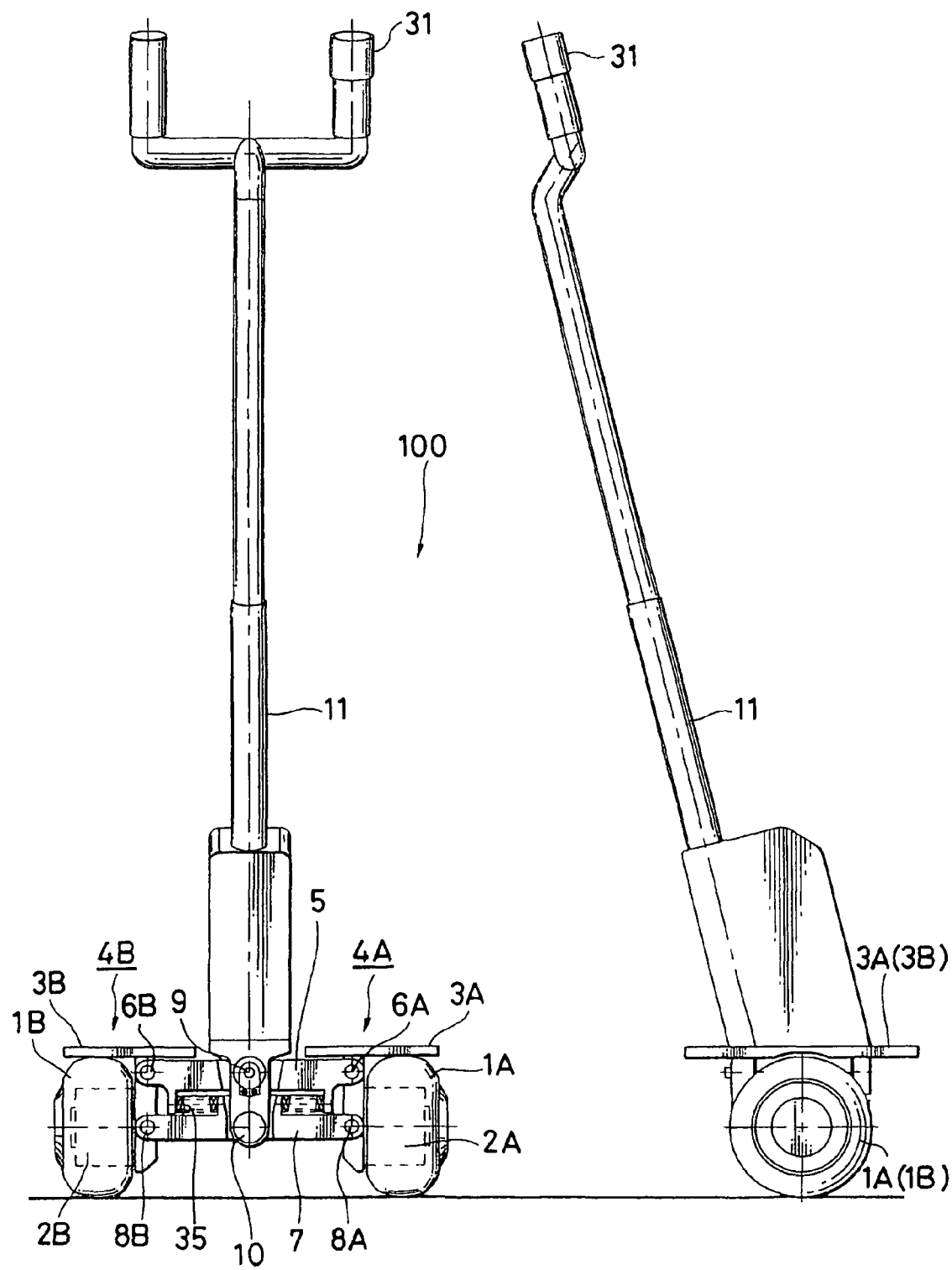
FIG. 2 is a diagram for explaining a novel coaxial two-wheel vehicle previously proposed by the applicants of the present invention.
Figure 3:
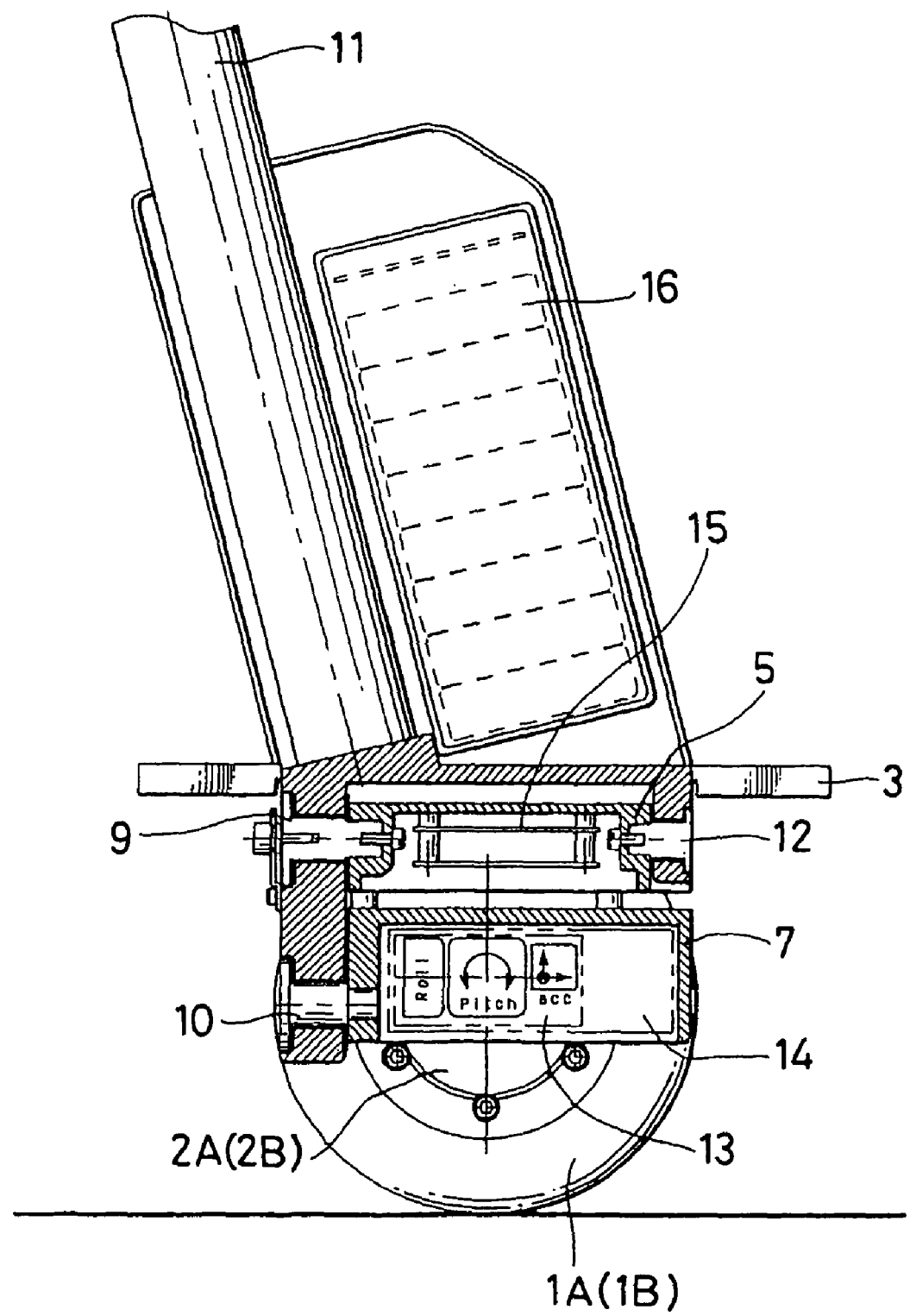
FIG. 3 is a diagram for explaining a novel coaxial two-wheel vehicle previously proposed by the applicants of the present invention.

First, a novel coaxial two-wheel vehicle previously proposed by the applicants of the present invention (Japanese Patent Application No. 2005-117365), to which embodiments of the present invention are applied, is explained by referring to FIGS. 2 and 3. However, embodiments are not limited to the previously proposed coaxial two-wheel vehicle.

[Schematic Configuration of Traveling Apparatus]

FIG. 2 shows a front view of an external appearance of a traveling apparatus (coaxial two-wheel vehicle) with a side view thereof and FIG. 3 shows an enlarged view of a relevant part thereof. A traveling apparatus 100 in FIG. 2 is configured to have a pair of wheels 1A and 1B disposed parallel, driver units 2A and 2B to drive and rotate the wheels 1A and 1B independently, and right and left step units 4A and 4B supporting those driver units 2A and 2B and including step plates 3A and 3B for a ride to ride on, respectively.

Further, a vehicle body divided into upper and lower portions is provided in order for the respective step units 4A and 4B on the right and left to move parallel and to be joined to each other. The vehicle-body upper portion 5 is joined to the step plates 3A and 3B through rotation support pins 6A and 6B, and further a vehicle-body lower portion 7 is joined to the step plates 3A and 3B through rotation support pins 8A and 8B, forming a parallel link.

Furthermore, a handle post 11 is also joined to the vehicle-body upper portion 5 and vehicle-body lower portion 7 through a rotation support pin 9 (including a pin 12 in FIG. 3) and a rotation support pin 10, being movable parallel with the step units 4A and 4B. At this time, the traveling apparatus maintains a state shown in FIG. 2, in which springs 35 are arranged between the divided vehicle-body upper portion 5 and vehicle-body lower portion 7 so that the handle post 11 stands by itself.

FIG. 3 is a cross-sectional diagram of the traveling apparatus 100 viewed from a lateral side. Inside the vehicle-body lower portion 7 is provided a posture sensor unit 13 including a gyroscopic sensor and an acceleration sensor. The gyroscopic sensor detects an angular velocity of at least any one of pitch axis, yaw axis and roll axis. The acceleration sensor detects acceleration of at least any one of X axis, Y axis and Z axis. Thus, the angular velocity and the acceleration of the traveling apparatus body are detected to be controlled during the traveling.

Further, a signal for maintaining a predetermined traveling state is output to a drive circuit 15 disposed in the vehicle-body upper portion 5 through a computing unit 14 based on a signal from each of posture detection sensors in the posture sensor unit 13, driving the wheel 1A (1B) by the driver unit 2A (2B) thus constituting the traveling apparatus 100. In addition, a battery 16 being a power source for the whole traveling apparatus 100 is disposed in the vicinity of the lower end of the handle post 11.

Figure 4:
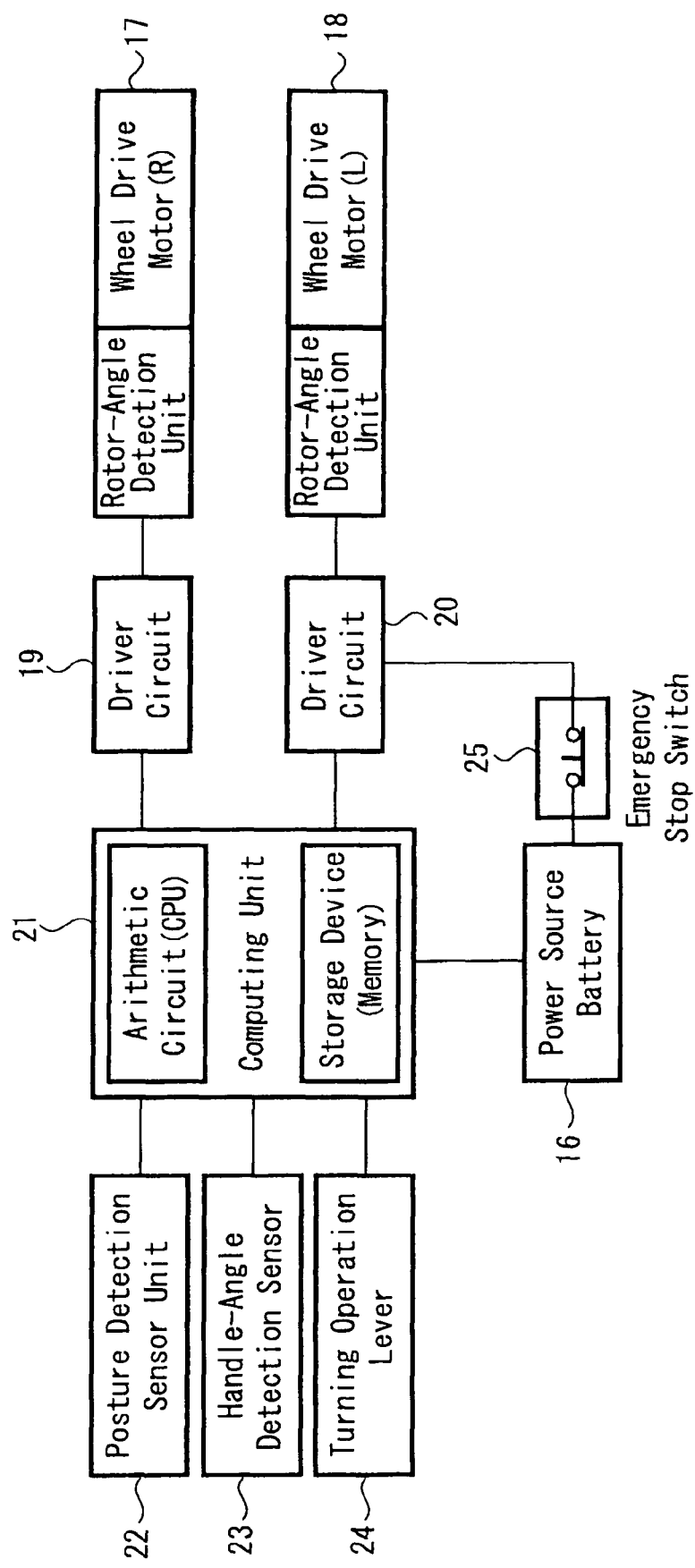
FIG. 4 is a block diagram showing a circuit configuration of a traveling apparatus to which a traveling apparatus and a method of controlling the traveling apparatus according to an embodiment of the present invention are applied.

A traveling apparatus and a method of controlling the traveling apparatus according to an embodiment of the present invention are applied to the above-described traveling apparatus 100. Therefore, embodiments of the present invention are explained hereinafter by referring to the accompanied drawings. FIG. 4 is a block diagram showing a circuit configuration of the traveling apparatus 100 to which embodiments of the present invention are applied.

[Configuration of Apparatus]

As shown in FIG. 4, a right wheel drive motor 17 and a left wheel drive motor 18, each of which has a rotor-angle detection unit, are connected to a computing unit 21 incorporating an arithmetic circuit (CPU) and a storage device (memory) through drive circuits 19 and 20, respectively. Further, electric power is supplied from the battery 16 to the computing unit 21 and the drive circuits 19, 20. Furthermore, an emergency stop switch 25 incorporated in a handle grip 31 shown in FIG. 2, for example, is provided on a path through which electric power is supplied to the drive circuits 19, 20.

Further, to the computing unit 21 are connected a posture detection sensor unit 22 that detects the posture of a traveling apparatus, in other words, detects pitch, yaw, roll axes angular velocity by the gyroscopic sensor and X, Y, Z axes acceleration by the acceleration sensor, a handle-angle detection sensor 23 and a turning control lever 24. Then, based on signals from those sensors the computing unit 21 calculates and outputs signals for maintaining a predetermined traveling state to the drive circuits 19 and 20 so that the wheels (not shown) are driven using the right wheel drive motor 17 and the left wheel drive motor 18.

[State of Vehicle Traveling]

Figure 5:
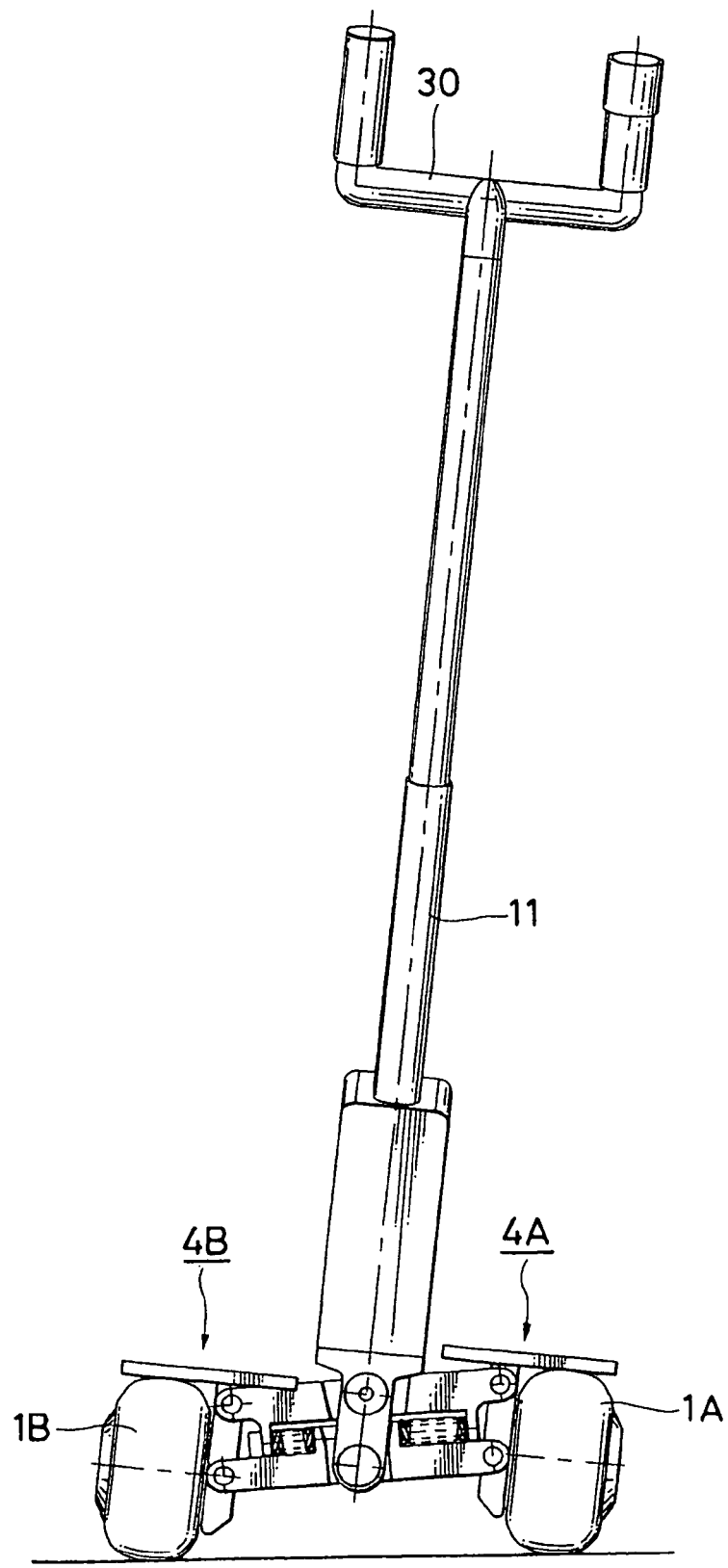
FIG. 5 is a diagram for explaining an embodiment of the present invention.

FIG. 5 shows a state of the vehicle when the traveling apparatus 100 is making a turn. In FIG. 5, a rider (not shown) inclines a handle 30 and his/her upper body toward the center of the turn (inside), and so the step units 4A, 4B and the wheels 1A, 1B are inclined parallel with the handle 30 (handle post 11), causing the whole vehicle with the rider to be in a state against centrifugal force.

Further, FIGS. 6A and 6B show states of the vehicle on road surfaces having difference in the roll axis direction (right-left direction with respect to forward direction) such as when one of the wheels runs onto a step (FIG. 6A) and when the vehicle travels on a cant road surface (FIG. 6B). The rider keeps the handle 30 vertically when traveling straight and so the step plates do not tilt in the lateral direction, enabling the surface change being absorbed by adjusting the right and left step plates in the height direction. Accordingly, since the upper body is not swayed to the right and left even when a rider is traveling in a state of the center of gravity being high in position such as in a standing posture, stable steering and traveling can be performed.

Figure 7A:
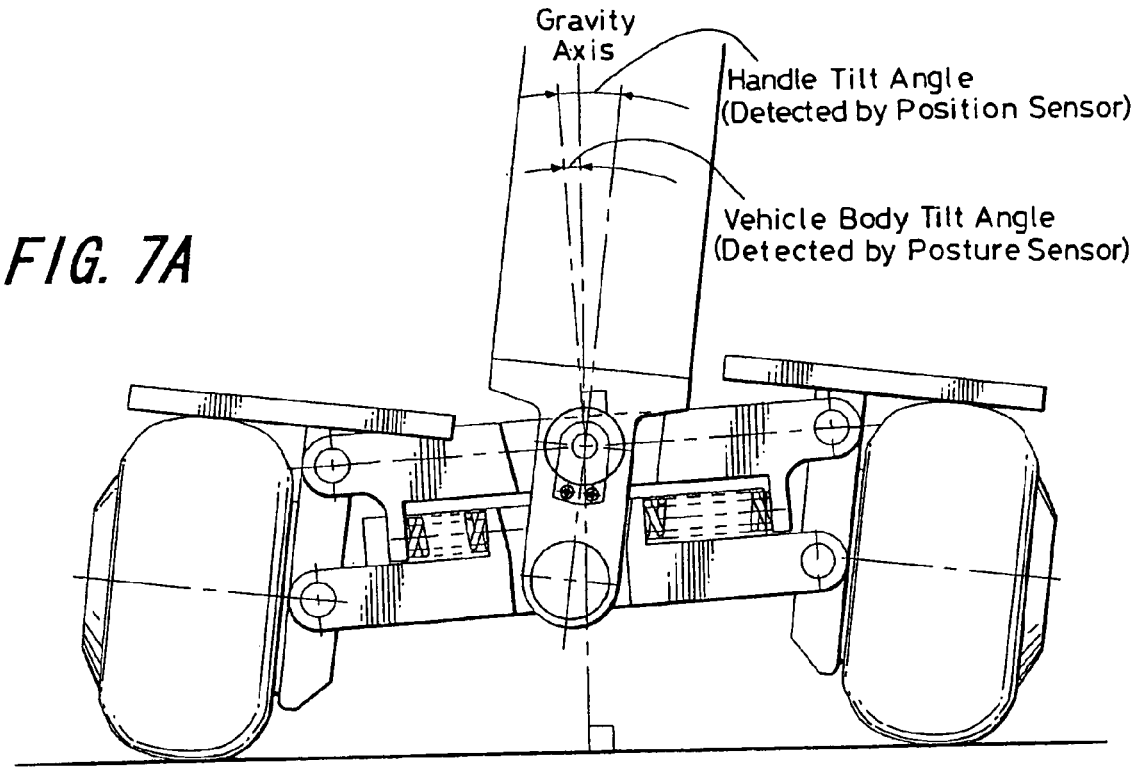
FIGS. 7A and 7B are diagrams for explaining an embodiment of the present invention.
Figure 7B:
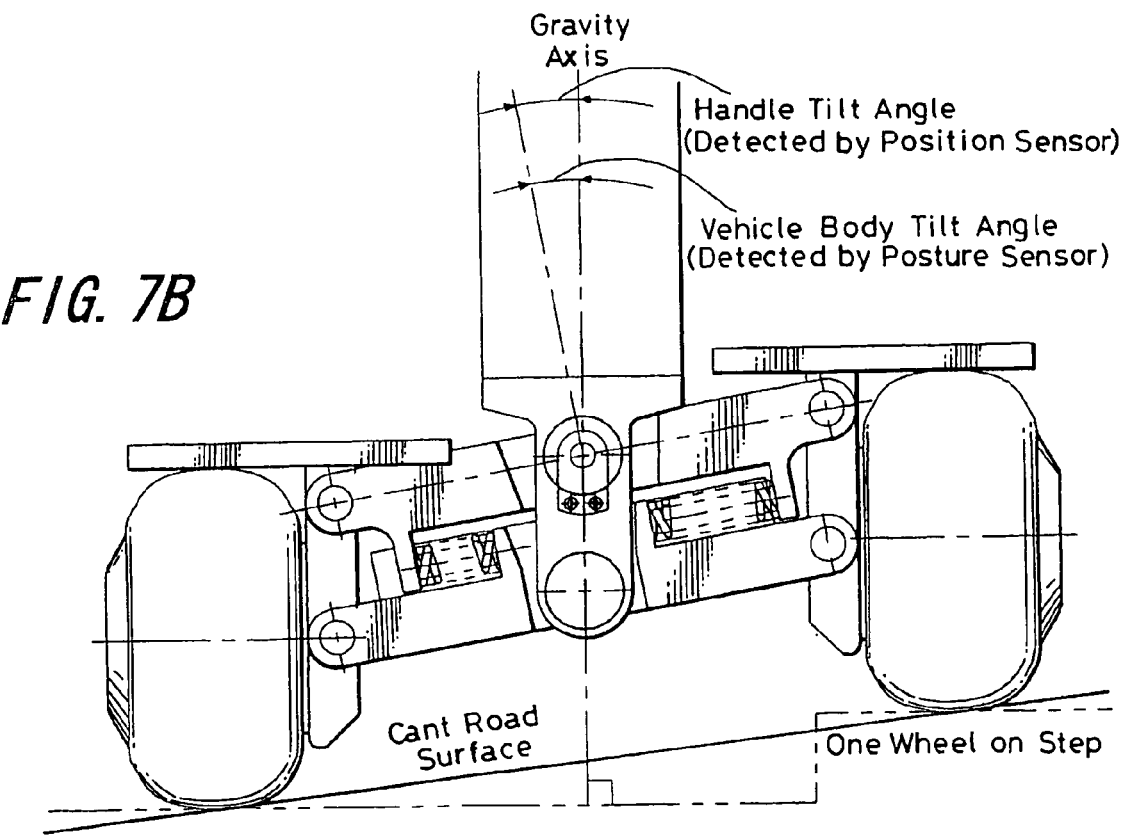

Furthermore, FIGS. 7A and 7B show a relation between an angle of the handle inclined (detected by a position sensor) and a tilt angle of the vehicle body (detected by a posture sensor). FIGS. 7A and 7B explain a relation between the turning (FIG. 5) and the traveling on the cant road surface or traveling with one wheel running on the step (FIG. 6) which are described above.

[State of Vehicle Turning on Inclined Plane]

Figure 8:
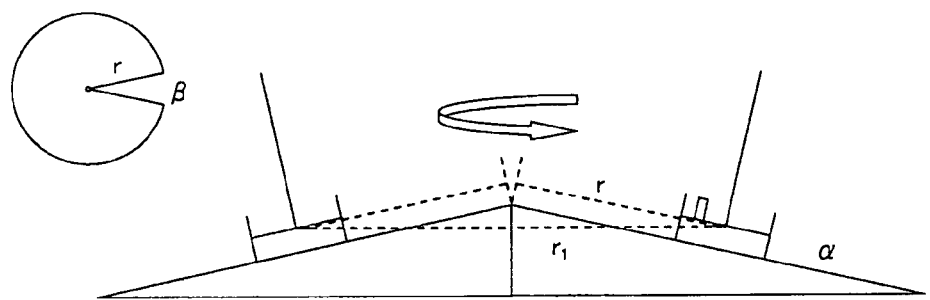
FIG. 8 is a diagram for explaining an embodiment of the present invention.

FIG. 8 shows a situation with which a model of turning on an inclined plane is obtained. Specifically, FIG. 8 shows a state in which the center of the vehicle makes a turn with a radius rl on a cone-shaped ground having an inclined plane of angle α.

In this regard, a distance traveled by the vehicle regarding the center thereof becomes 2πrl when the vehicle makes one round on the conical surface in certain time t, and an angular velocity ω1 around the Z axis of the gyroscopic sensor is expressed as follows:

$$t = \frac{2\pi}{\omega 1} \quad \text{[Formula 1]}$$

On the other hand, assuming that the cone-shaped ground is carved out flat and the vehicle travels on the flat surface, a distance traveled by the vehicle becomes as follows:

$$(2\pi - \beta) \cdot r \quad \text{[Formula 2]}$$

An angular velocity ω obtained from a rotational difference between right and left tires which is derived from the above formula is as follows:

$$t = \frac{2\pi - \beta}{\omega} \quad \text{[Formula 3]}$$

Accordingly, the relation between α and β is expressed as follows:

$$(2\pi - \beta) \cdot r = 2\pi \cdot r \cdot \cos\alpha \quad \text{[Formula 4]}$$
$$\cos\alpha = \frac{2\pi - \beta}{2\pi}$$

Further, the relation between ω1 and ω is expressed as follows:

$$t = \frac{2\pi}{\omega 1} = \frac{2\pi - \beta}{\omega} = \frac{2\pi\cos\alpha}{\omega} \quad \text{[Formula 5]}$$
$$\omega 1 = \frac{\omega}{\cos\alpha}$$

Accordingly, an angular velocity $\dot{\theta}_p$ to be detected by the pitch axis gyroscopic sensor becomes as follows:

$$\dot{\theta}_p = \omega 1 \cdot \sin\alpha = \frac{\sin\alpha}{\cos\alpha}\omega = \omega \cdot \tan\alpha \quad \text{[Formula 6]}$$

[State of Vehicle Turning on Inclined Plane (Turning with Inclination with respect to Traveling Plane)]

Further, regarding a parallel two-wheel vehicle having the vehicle body of a parallel link structure, there is such a case that the vehicle makes a turn in a state where the vehicle body is inclined to the inclined plane. In this regard, a tilt of the pitch axis gyroscopic sensor from a vertical axis becomes θr instead of α. This value can be obtained based on measurement using the angle sensor for the roll axis, however, a value of the angle α of the inclined plane may not be obtained directly.

Specifically, the angular velocity $\dot{\theta}_p$ to be detected by the pitch axis gyroscopic sensor in this case becomes as follows:

$$\dot{\theta}_p = \omega 1 \cdot \sin\theta_r = \frac{\sin\theta_r}{\cos\alpha}\omega \qquad \text{[Formula 7]}$$

Figure 9:
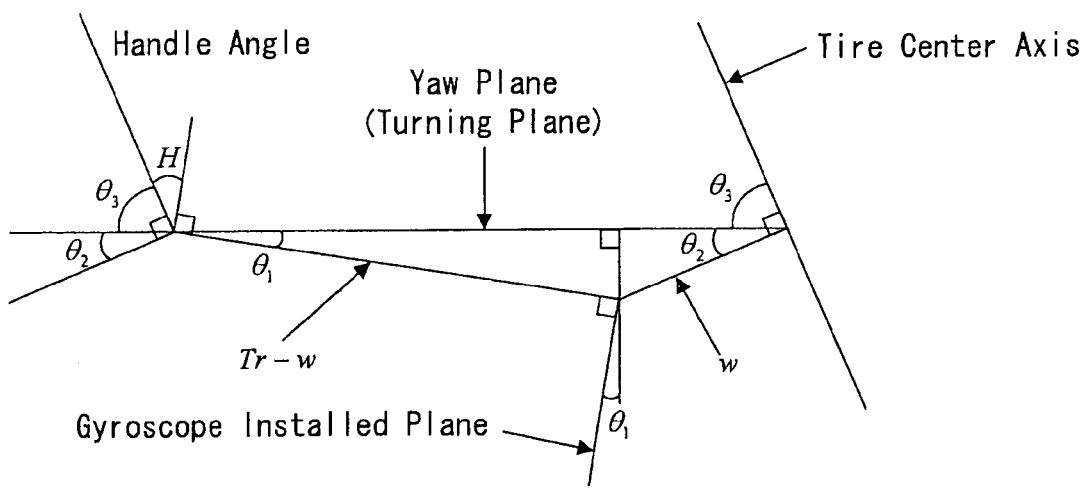
FIG. 9 is a diagram for explaining an embodiment of the present invention.

Therefore, a value θ1 that is a tilt angle of a platform with respect to the inclined plane can be obtained based on an inclination H of the handle and a vehicle body size (a half of tread Tr and link length w) in this case, and α can be obtained from a relation of $\theta_r - \alpha = \theta_1$. More specifically, the angle θ1 can be obtained using an output from a sensor (such as a potentiometer, for example) measuring the size of the vehicle body and internal state of the vehicle body shown in FIG. 9 and a relation expressed in the following formula:

$(Tr-w) \cdot \sin\theta_1 = w \cdot \sin(H-\theta_1) = w \cdot \sin H \cdot \cos\theta_1 - w \cdot \cos H \cdot \sin\theta_1$ $(Tr-w+w \cdot \cos H) \cdot \sin\theta_1 = w \cdot \sin H \cdot \cos\theta_1$ [Formula 8]

$$\frac{\sin\theta_1}{\cos\theta_1} = \tan\theta_1 = \frac{w \cdot \sin H}{Tr - w(1-\cos H)}$$

$$\therefore \theta_1 = \tan^{-1}\left[\frac{\sin H}{\frac{Tr}{w} - 1 + \cos H}\right]$$

$\alpha = \theta_r - \theta_1$ $$\dot{\theta}_p = \frac{\sin\theta_r}{\cos\alpha} \cdot \omega = \frac{\sin\theta_r}{\cos(\theta_r - \theta_1)} \cdot \omega$$

Accordingly, an influence of the yaw axis angular velocity caused by the turning can be cancelled by subtracting the above value from the value measured by the pitch axis gyroscopic sensor, and so the pitch axis can be controlled to be stable. Moreover, according to this method, it is also assumed that the correction can be carried out regarding an inclination caused by a change in the radius when the tire is pressed due to a difference of right and left loads.

Therefore, according to the traveling apparatus and the method of controlling the traveling apparatus of the above-described embodiments, a sensor correction algorithm can be obtained. The sensor correction algorithm is efficient when measuring the posture of a vehicle body traveling as described below, in the case where traveling performance is desirably improved regarding a traveling apparatus of a vehicle structure having two wheels disposed parallel to travel.

Specifically, if traveling including a turn is performed on an inclined plane or on an uneven surface without making this correction, the vehicle body gradually inclines, and so it becomes difficult for a rider to keep the balance. On the other hand, in the case where the sensor correction algorithm according to embodiments of the present invention is applied, the posture can be measured stably when making a turn with the vehicle body being inclined even on a level road surface.

Further, FIGS. 10 through 13 show posture measurement data in the case where the turn is made on a slope having an angle of 10° without carrying out this correction (FIG. 10, FIG. 11) and in the case where the turn is made on the slope while carrying out the correction (FIG. 12, FIG. 13). In those figures, an angle measured by the acceleration sensor is described as Acc, an angle obtained from an integration by the gyroscopic sensor is described as Gyr, and an angle synthesized by a filter operation and used for posture control is described as Fil.

Figure 10A:
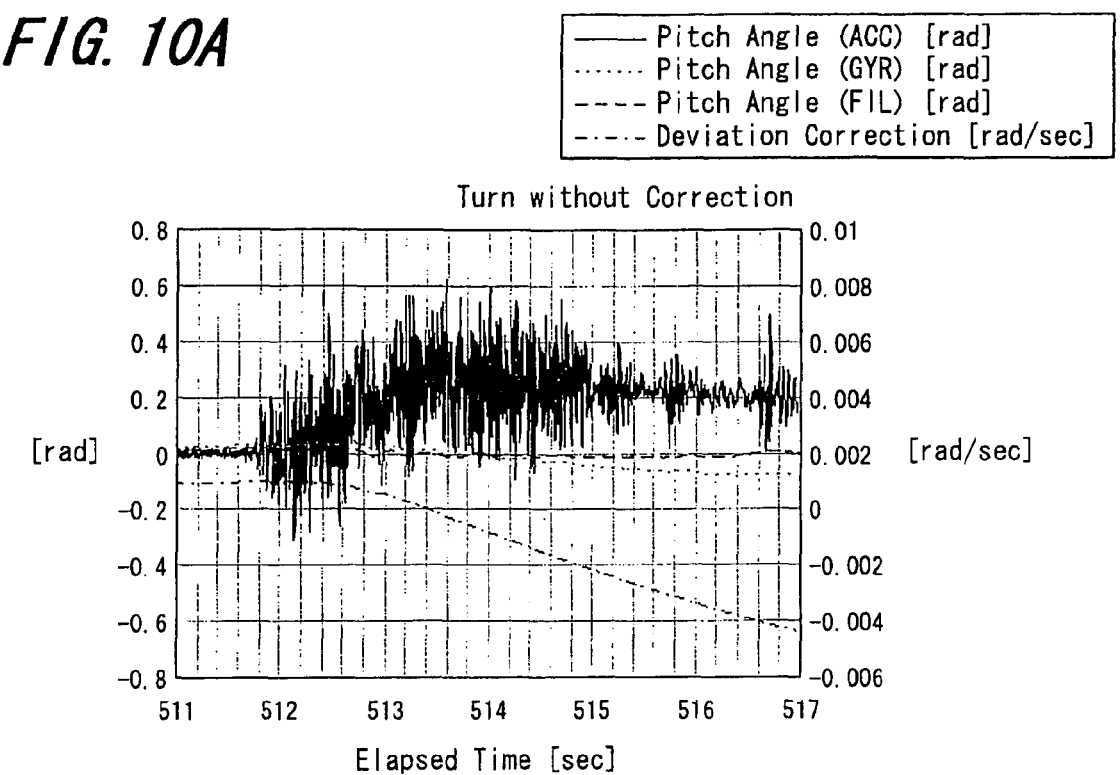
FIGS. 10A and 10B are waveform charts showing measured values for explaining an embodiment of the present invention.
Figure 10B:
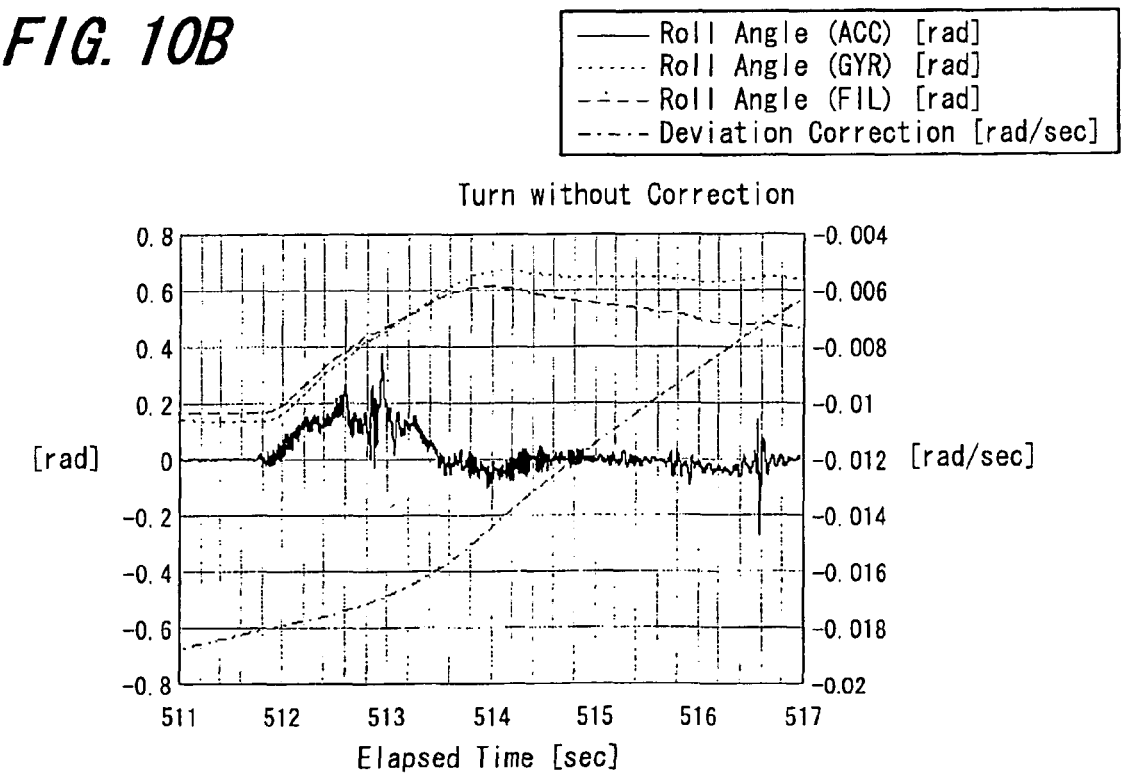

FIGS. 10A and 10B show data measured on the pitch angle and roll angle of the vehicle body respectively, in the case where the vehicle makes a turn of 180° in the clockwise direction without the correction and without the vehicle being inclined by the handle, from a state of the vehicle being stopped facing in an ascending direction on an inclined plane. In this regard, the angle measured by the acceleration sensor differs from the angle measured by the gyroscopic sensor, and the vehicle can barely stop in a state leaning forward by about 10° after the turn. A deviation correction amount measured in the filter operation is changed greatly.

Figure 11A:
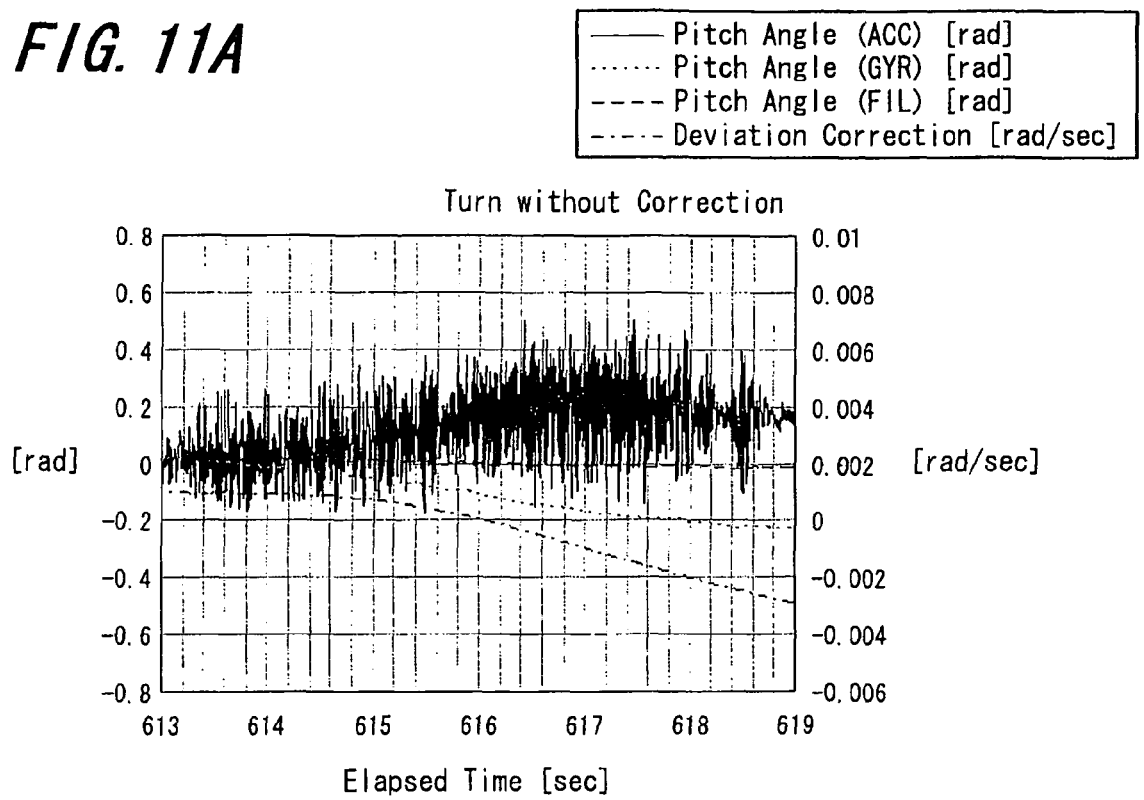
FIGS. 11A and 11B are waveform charts showing measured values for explaining an embodiment of the present invention.
Figure 11B:
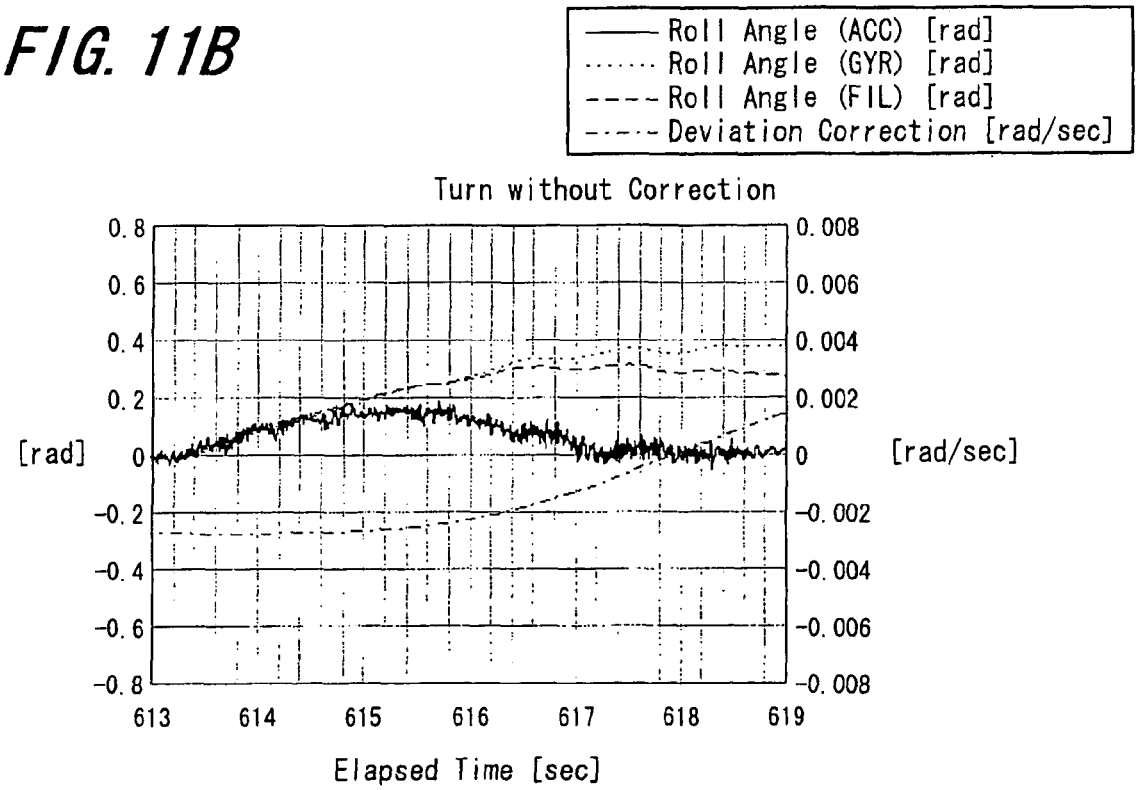

Next, FIGS. 11A and 11B show data measured on the pitch angle and roll angle of the vehicle body respectively, in the case where the vehicle makes a turn of 180° in the clockwise direction without the correction but with the vehicle being inclined by the handle, from a state of the vehicle being stopped facing in an ascending direction on the inclined plane. In this regard, the handle is away from the rider's body due to the inclination caused by the turn, and therefore the turn can only be made slowly because it is difficult to incline the handle sufficiently. Also, in the case of the turn in the opposite direction (from descent to ascent) although not shown in the figures, the turn is forced to be stopped midway since the turn causes the handle to hit the rider's body.

Figure 12A:
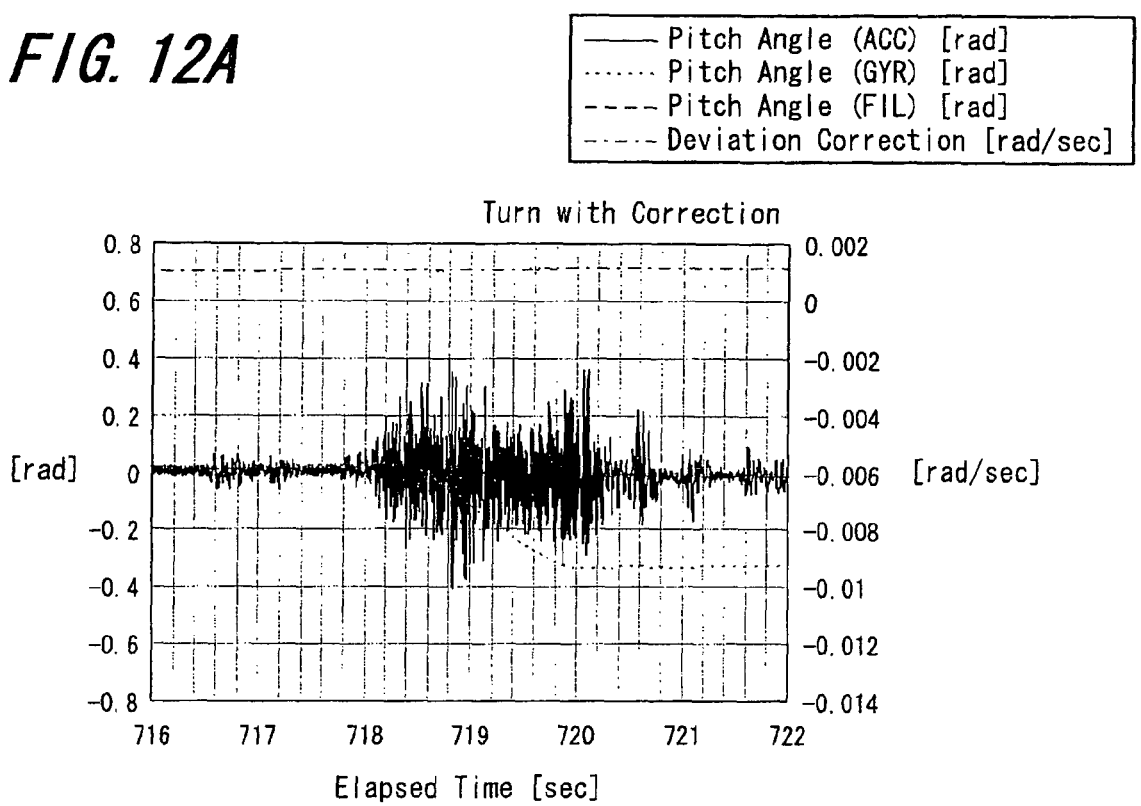
FIGS. 12A and 12B are waveform charts showing measured values for explaining an embodiment of the present invention.
Figure 12B:
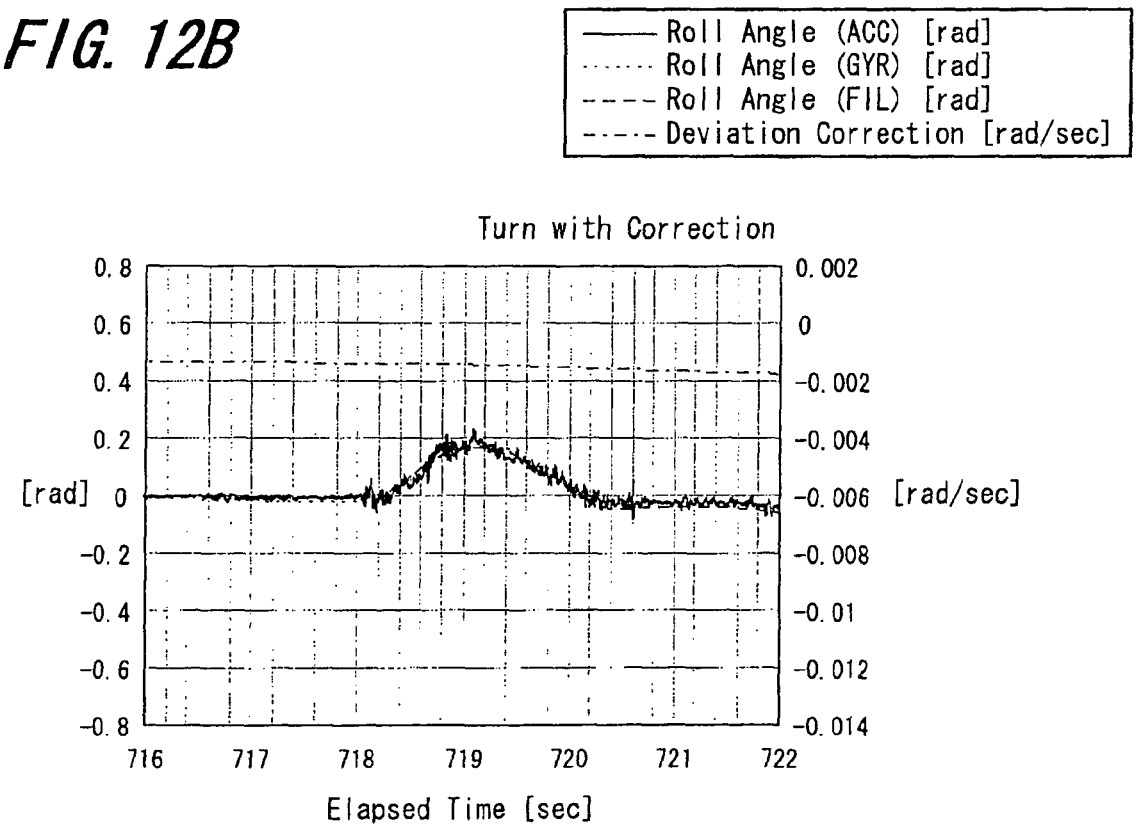

On the other hand, FIGS. 12A and 12B show data measured on the pitch angle and roll angle of the vehicle body respectively, in the case where the vehicle makes a turn of 180° in the clockwise direction with the correction and without the vehicle being inclined by the handle, from a state of the vehicle being stopped facing in an ascending direction on the inclined plane. In this regard, the vehicle makes a stable turn without problems. Further, the deviation correction amount is not changed.

Figure 13A:
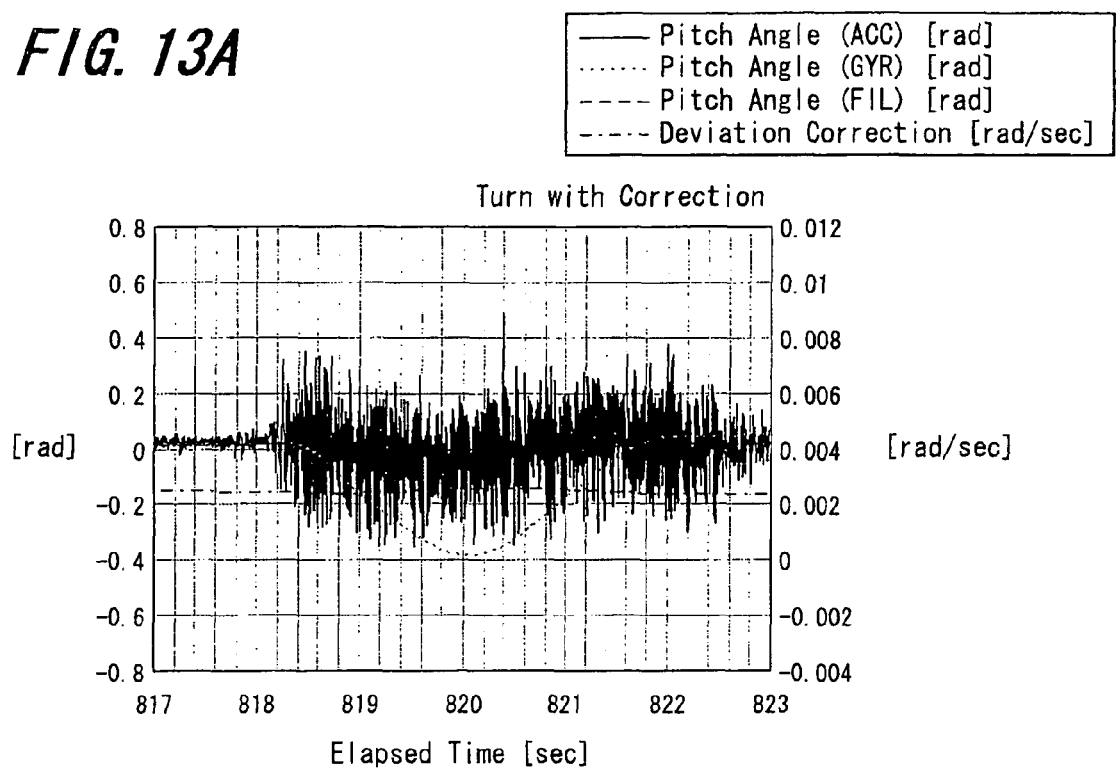
FIGS. 13A and 13B are waveform charts showing measured values for explaining an embodiment of the present invention.
Figure 13B:
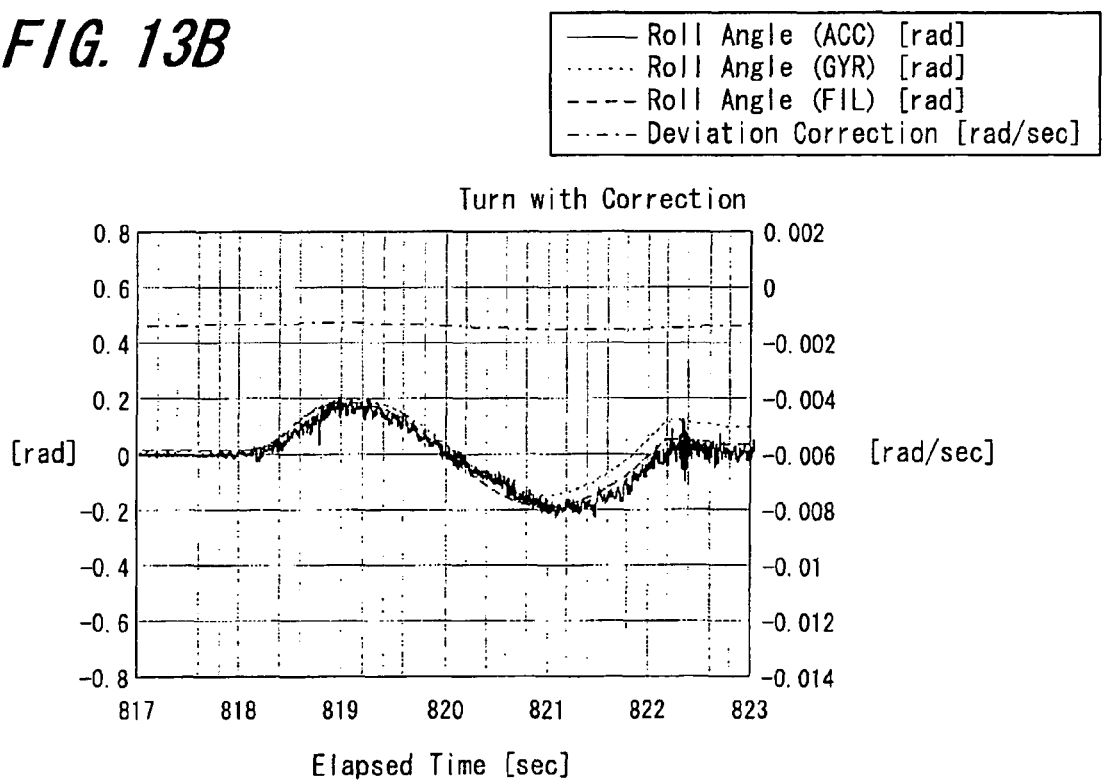

Moreover, FIGS. 13A and 13B show data measured on the pitch angle and roll angle of the vehicle body respectively, in the case where the vehicle makes a turn of 360° in the clockwise direction with the correction and without the vehicle being inclined by the handle, from a state of the vehicle being stopped facing in an ascending direction on the inclined plane. Further in this case, the vehicle can continue a stable turn.

Thus, according to the traveling apparatus and the method of controlling the traveling apparatus of the above-described embodiments, the inclination of the pitch angular velocity sensor with respect to the horizontal plane is estimated using the sensor measuring the tilt of the vehicle body in the roll axis direction. The yaw rate mixed in the pitch angular velocity sensor is obtained based on the estimated inclination and the turn velocity of the vehicle body, and so the correct pitch angle is calculated by canceling the yaw rate mixed. Therefore, the vehicle can be controlled stably during the turn by using the angle formed as described above between the turning plane and the vehicle body.

More specifically, the pitch angular velocity can be corrected using the obtained roll angle between the turning plane and the vehicle body, according to the embodiment. Accordingly, there is no need to install the angular velocity sensor for measuring the pitch angle accurately to be vertical to a turning plane, which has caused a restriction in a design of a vehicle body in related art.

Figure 14:
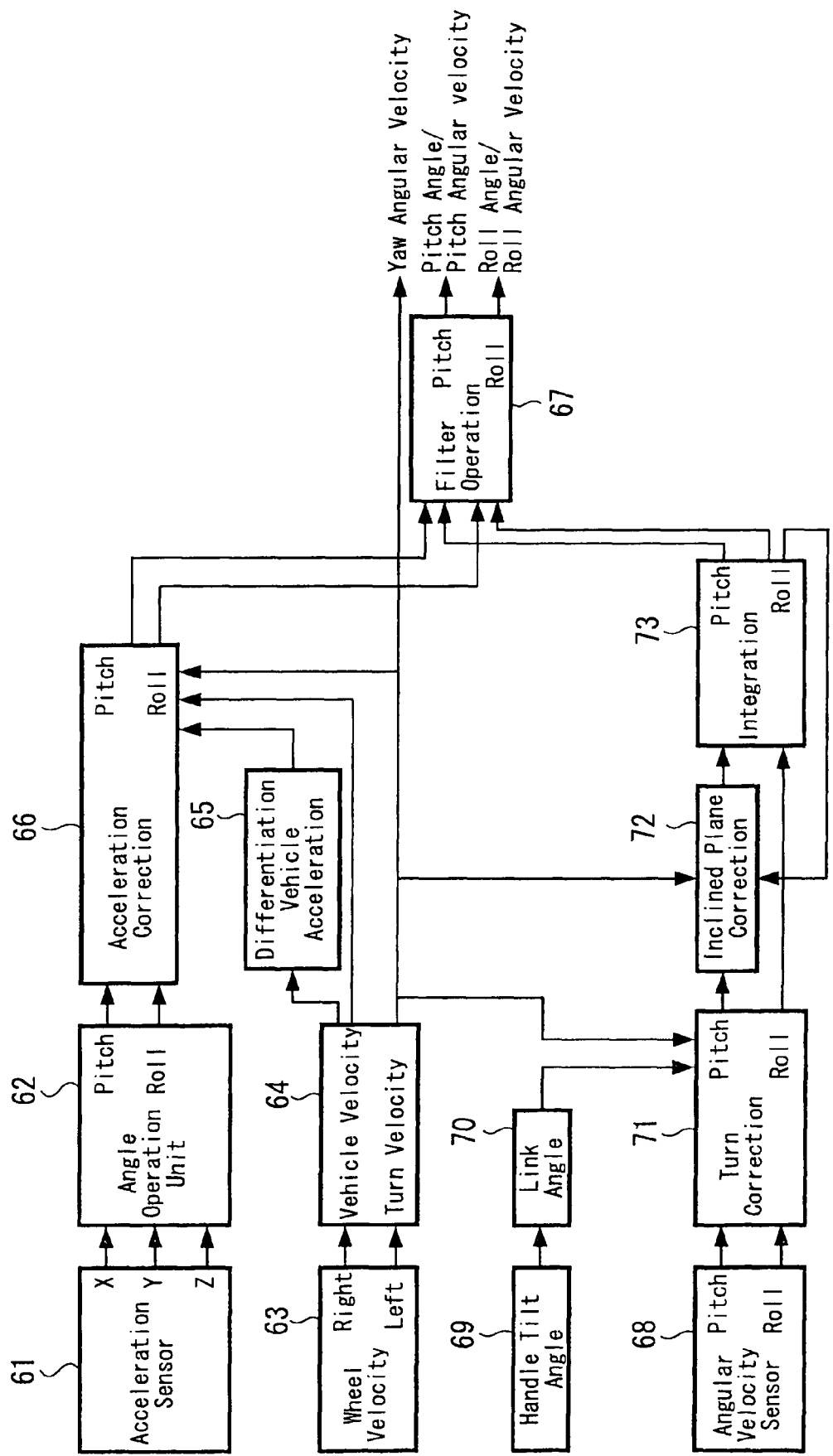
FIG. 14 is a function block diagram showing a process flow when performing all the processing of an embodiment of the present invention.

FIG. 14 is a function block diagram showing the whole flow of processing including all of the above-described processing. Specifically in FIG. 14, acceleration regarding each of X, Y and Z axes detected by an acceleration sensor 61 is supplied to an angle operation unit 62 and so the pitch angle and roll angle are calculated. Further, velocity regarding each of the right and left wheels detected by a wheel velocity detection unit 63 is supplied to a vehicle velocity and turn velocity operation unit 64 where the vehicle velocity and the turn velocity are calculated.

Then, vehicle velocity calculated by the vehicle velocity and turn velocity operation unit 64 is supplied to a differential operation unit 65 where vehicle acceleration is calculated. The vehicle acceleration, and the vehicle velocity and turn velocity supplied from the vehicle velocity and turn velocity operation unit 64 are supplied to an acceleration-correction and centrifugal-force-correction operation unit 66 where the values of the pitch and roll angles calculated by the angle operation unit 62 are corrected. Further, the corrected values of the pitch and roll angles are supplied to a filter operation unit 67.

On the other hand, angular velocity of each of the pitch and roll angles is detected by an angular velocity sensor 68. In addition, the handle tilt angle detected by a handle tilt angle detection unit 69 is supplied to a link angle operation unit 70, and a link angle calculated and the turn velocity calculated by the vehicle velocity and turn velocity operation unit 64 are supplied to a turn correction operation unit 71 where a turn correction is made with respect to the pitch angular velocity and roll angular velocity detected by the angular velocity sensor 68.

Further, the pitch angular velocity to which the turn correction is made by the turn correction operation unit 71 is supplied to an inclined plane correction operation unit 72 where an inclined plane is corrected based on the turn velocity calculated by the vehicle velocity and turn velocity operation unit 64. The pitch angular velocity to which the inclined plane correction is made by the inclined plane correction operation unit 72 and the roll angular velocity to which the turn correction is made by the turn correction operation unit 71 are supplied to an integration operation unit 73. Then, those integrated values of the pitch and roll angles are supplied to the filter operation unit 67.

Accordingly, the pitch angle, pitch angular velocity, roll angle and roll angular velocity are obtained from the filter operation unit 67. In addition, the turn velocity calculated by the vehicle velocity and turn velocity operation unit 64 is obtained as the yaw angular velocity. Further, the roll angle and the roll angular velocity are supplied from the integration operation unit 73 to the inclined plane correction operation unit 72 to be used for the inclined plane correction of the pitch angular velocity. The correction of each angular velocity of pitch, roll and yaw and the correction of the pitch angle and roll angle are performed by the processing described above.

Thus, according to an embodiment of the present invention there is provided a traveling apparatus including two wheels provided parallel each of which is driven independently, being controlled to be stable in an anteroposterior direction between the two wheels and traveling. The traveling apparatus includes a mechanism estimating the inclination of the plane where the pitch angular velocity sensor is horizontally installed with respect to the horizontal plane by using the sensor measuring the tilt of the vehicle body in the roll axis direction. The traveling apparatus further includes a mechanism obtaining the yaw rate mixed in the pitch angular velocity sensor based on the estimated inclination and the turn velocity of the vehicle body so that the correct pitch angle is calculated by canceling the yaw rate mixed. Thus, the vehicle is stably controlled by the simplified mechanism during the turning on the inclined plane.

According to an embodiment of the present invention, there is provided a traveling apparatus including two wheels provided parallel each of which is driven independently, having a link structure in which a vehicle body is divided in two of upper and lower portions maintained parallel between the two wheels, being controlled to be stable in an anteroposterior direction between the two wheels and traveling. The traveling apparatus includes a mechanism calculating a tilt angle of a turning plane with respect to the horizontal plane when the vehicle body makes a turn being inclined toward the roll axis direction with respect to a traveling plane. The tilt angle is calculated by adding a value measured by a roll axis tilt sensor to a roll angle formed between the turning plane and the vehicle body and obtained based on measurement of a state inside the vehicle body and geometrical calculations. Thus, an accurate tilt angle of the turning plane can be calculated by the simplified mechanism.

Further, according to an embodiment of the present invention, there is provided a method of controlling the traveling apparatus including two wheels provided parallel each of which is driven independently, being controlled to be stable in an anteroposterior direction between the two wheels and traveling. The method includes the steps of: estimating an inclination of a plane where a pitch angular velocity sensor is horizontally installed with respect to the horizontal plane using a sensor measuring a tilt of a vehicle body in the roll axis direction; obtaining a yaw rate mixed in the pitch angular velocity sensor based on the estimated inclination and a turn velocity of the vehicle body; and calculating a correct pitch angle by canceling the yaw rate mixed. Thus, the vehicle is easily controlled to be stable during the turn on the inclined plane.

Furthermore, according to an embodiment of the present invention, there is provided a method of controlling the traveling apparatus including two wheels provided parallel each of which is driven independently, having a link structure in which a vehicle body is divided in two of upper and lower portions maintained parallel between the two wheels, being controlled to be stable in an anteroposterior direction between the two wheels and traveling. The method includes the steps of: obtaining a roll angle formed between the turning plane and the vehicle body based on measurement of a state inside the vehicle body and geometrical calculations; and calculating a tilt angle of a turning plane with respect to the horizontal plane by adding a measured value of a roll axis tilt sensor to the roll angle, when the vehicle body makes a turn being inclining toward the roll axis direction with respect to the traveling plane. Thus, the accurate tilt angle of the turning plane can easily be calculated.

Note that, the present invention is not limited to the preferred embodiments explained hereinbefore, but various alterations are possible without departing from the scope and spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A traveling apparatus including two wheels that are provided parallel to each other and that are each independently driven, wherein the traveling apparatus is controlled to travel and to be stable in an anteroposterior direction between said two wheels, comprising:

a first sensor that measures a pitch angular velocity and that is horizontally installed in a first plane that extends along a direction of movement of the traveling apparatus;

a second sensor that measures a tilt of a vehicle body in a roll axis direction;

means for estimating an inclination of the first plane with respect to a horizontal plane based on an output of said second sensor;

means for determining a yaw rate component of the pitch angular velocity measured by the first sensor, wherein the yaw rate component is an amount of the pitch angular velocity detected by the first sensor that is attributable to a yaw rate of the traveling apparatus, and wherein the yaw rate component is determined based on the inclination estimated by the means for estimating and a turn velocity of the vehicle body; and means for calculating a correct pitch angle of said pitch angular velocity measured by said first sensor by canceling the yaw rate component from said measured pitch angular velocity.

2. A traveling apparatus including two wheels that are provided parallel to each other and that are each independently driven, a link structure in which a vehicle body is divided in two of upper and lower portions maintained parallel between said two wheels, wherein the traveling apparatus is controlled to travel and to be stable in an anteroposterior direction between said two wheels, comprising:

means for calculating a roll angle θ1 formed between a horizontal traveling plane and the vehicle body when said vehicle makes a turn being inclined toward the roll axis direction with respect to horizontal traveling plane;

means for calculating a pitch angle θp by integrating a value obtained by canceling out a yaw rate mixed from a pitch angular velocity θdotp, the yaw rate mixed being calculated from the roll angle θ1 and a yaw angle velocity ω; and means for controlling an inverted state using the pitch angle θp, wherein said roll angle is obtained based on a measurement of a state of the vehicle body and size of the vehicle body.

3. A traveling apparatus according to claim 2, further comprising:

means for determining a yaw rate component of a pitch angular velocity measured by a pitch angular velocity sensor, wherein the yaw rate component is an amount of the pitch angular velocity detected by the pitch angular velocity sensor that is attributable to a yaw rate of the traveling apparatus, and wherein the yaw rate component is determined based on said obtained roll angle formed by the horizontal plane and the vehicle body, the calculated tilt angle formed between the horizontal plane and the turning plane, and a turn velocity of said vehicle body; and means for calculating a correct pitch angle of said pitch angular velocity measured by the pitch angular sensor by canceling the yaw rate component from said measured pitch angular velocity.

4. A method of controlling a traveling apparatus including two wheels that are provided parallel to each other and that are each independently driven, wherein the traveling apparatus is controlled to travel and to be stable in an anteroposterior direction between said two wheels, comprising:

estimating an inclination of a first plane where a pitch angular velocity sensor is horizontally installed with respect to a horizontal plane based on output from a sensor that measures a tilt of a vehicle body in a roll axis direction, wherein said first plane extends along a direction of movement of the traveling apparatus;

obtaining a yaw rate component of a pitch angular velocity measured by said pitch angular velocity sensor based on said estimated inclination and a turn velocity of said vehicle body; and calculating a correct pitch angle by canceling the yaw rate component from said measured pitch angular velocity.

5. A method of controlling a traveling apparatus including two wheels that are provided parallel to each other and that are each, a link structure in which a vehicle body is divided in two of upper and lower portions maintained parallel between said two wheels, wherein the traveling apparatus is controlled to travel and to be stable in an anteroposterior direction between said two wheels, comprising:

measuring an angular velocity ω1 around a Z axis of a gyroscopic sensor;

obtaining a roll angle θ1 by using a sensor measuring a tilt of a vehicle body in a roll axis direction;

calculating a yaw angle velocity ω of the vehicle body;

calculating a yaw rate mixed in a pitch angular velocity θdotp from the angular velocity ω1, the roll angle θ1 and the yaw angle velocity ω;

integrating a value obtained by canceling out the yaw rate mixed, the yaw rate mixed being calculated from angular velocity ω1, the roll angle θ1 and a yaw angle ω; and controlling an inverted state by using the pitch angle θp, wherein the roll angle is obtained based on a measurement of a state of the vehicle body and size of the vehicle body.

6. A method of controlling a traveling apparatus according to claim 5, further comprising:

obtaining a yaw rate component of a pitch angular velocity measured by a pitch angular velocity sensor, wherein the yaw rate component is an amount of the pitch angular velocity detected by the pitch angular velocity sensor that is attributable to a yaw rate of the traveling apparatus, based on said obtained roll angle formed between the horizontal plane and the vehicle body, the calculated tilt angle between the horizontal plane and the turning plane, and a turn velocity of said vehicle body; and calculating a correct pitch angle by canceling the yaw rate component from said measured pitch angular velocity.

7. A traveling apparatus including two wheels that are provided parallel to each other and that are each independently driven, wherein the traveling apparatus is controlled to travel and to be stable in an anteroposterior direction between said two wheels, comprising:

a first sensor that measures a pitch angular velocity and that is horizontally installed in a first plane that extends along a direction of movement of the traveling apparatus;

a second sensor that measures a tilt of a vehicle body in a roll axis direction;

a mechanism that estimates an inclination of the first plane with respect to a horizontal plane based on an output of said second sensor;

a mechanism that determines a yaw rate component of the pitch angular velocity measured by the first sensor, wherein the yaw rate component is an amount of the pitch angular velocity detected by the first sensor that is attributable to a yaw rate of the traveling apparatus, and wherein the yaw rate component is determined based on the estimated inclination and a turn velocity of the vehicle body; and a mechanism that calculates a correct pitch angle of said pitch angular velocity measured by said first sensor by canceling the yaw rate component from said measured pitch velocity.

8. A traveling apparatus including two wheels that are provided parallel to each other and that are each independently driven, a link structure in which a vehicle body is divided in two of upper and lower portions maintained parallel between said two wheels, wherein the traveling apparatus is controlled to travel and to be stable in an anteroposterior direction between said two wheels, comprising:

a sensor which calculates a roll angle $\theta 1$ formed between a horizontal traveling plane and the vehicle body when said vehicle body makes a turn being inclined toward the roll axis direction with respect to the horizontal traveling plane;

a mechanism that integrates a value obtained by canceling out a yaw rate mixed, the yaw rate mixed being calculated from the roll angle $\theta 1$ and a yaw angle velocity $\omega 1$; and a mechanism that controls an inverted state by using the pitch angle $\theta p$, wherein said roll angle is obtained based on a measurement of a state of the vehicle body and size of the vehicle body.

9. A traveling apparatus according to claim 8, further comprising:

a mechanism that determines a yaw rate component of a pitch angular velocity measured by a pitch angular velocity sensor, wherein the yaw rate component is an amount of the pitch angular velocity detected by the pitch angular velocity sensor that is attributable to a yaw rate of the traveling apparatus, and wherein the yaw rate component is determined based on said obtained roll angle, the calculated tilt angle, and a turn velocity of said vehicle body; and a mechanism that calculates a correct pitch angle by canceling the yaw rate component from said measured pitch angular velocity.

10. A traveling apparatus according to claim 8, further comprising a handle post that is rotably mounted to the vehicle body upper portion and the vehicle body lower portion.

11. A traveling apparatus according to claim 10, wherein the traveling apparatus turns when the handle post is inclined toward a center of the turn.

12. A traveling apparatus according to claim 10, wherein the measurement of a state inside said vehicle body includes tilt angle of the handle post about the roll axis.

\* \* \* \* \*